Figure 21:
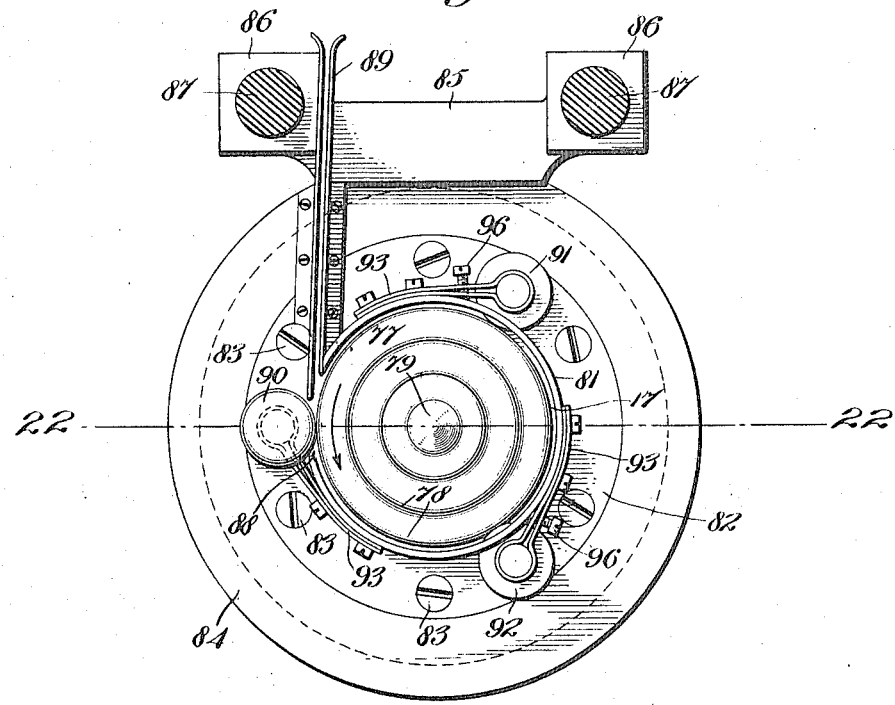

G. W. BEADLE.
MACHINE FOR MAKING PAPER CUPS.
APPLICATION FILED JAN. 30, 1912.
1,135,986.
Patented Apr. 20, 1915.
15 SHEETS—SHEET 1.
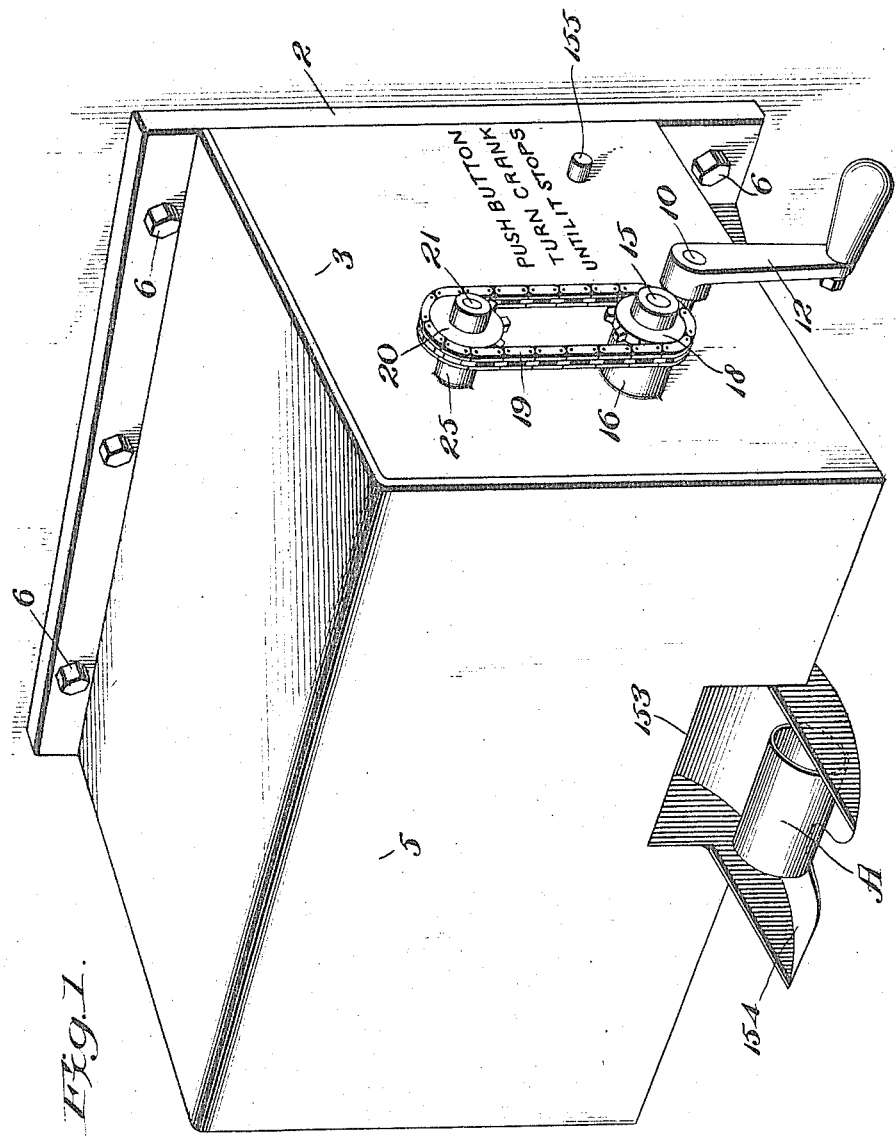
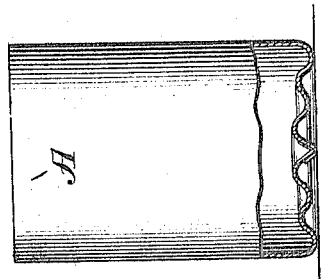
WITNESSES:
INVENTOR
Geo. W. Beadle
ATTORNEYS

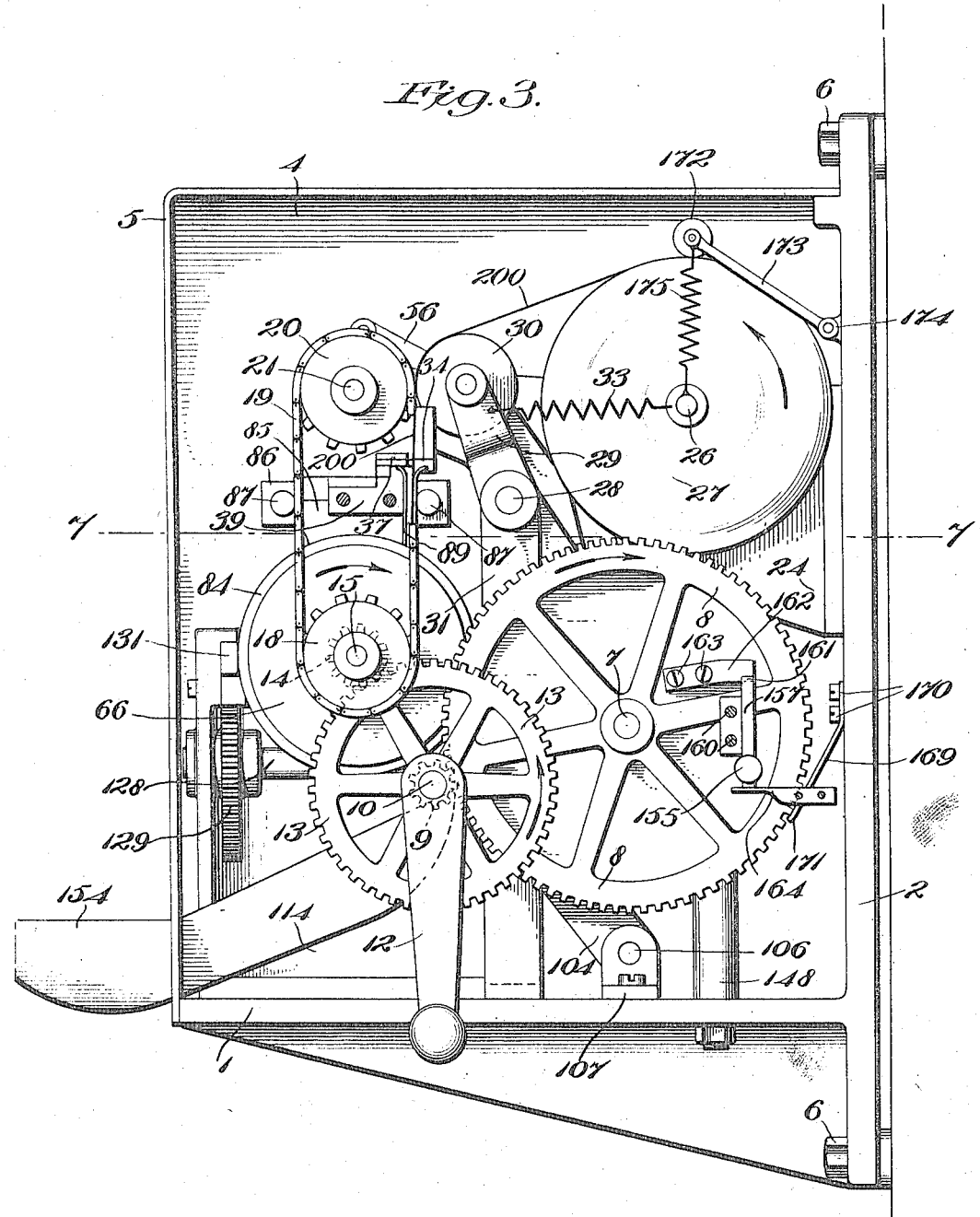

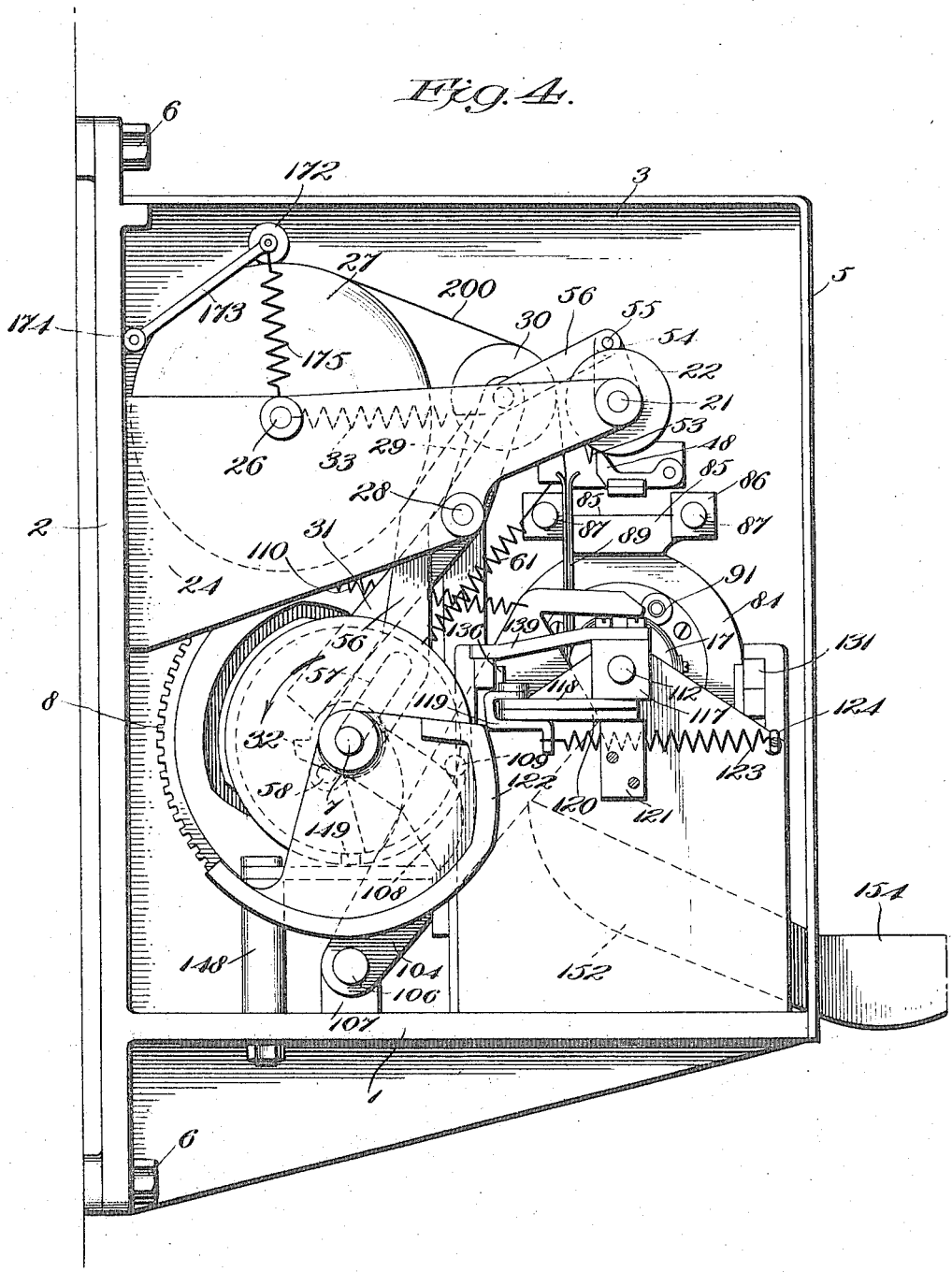

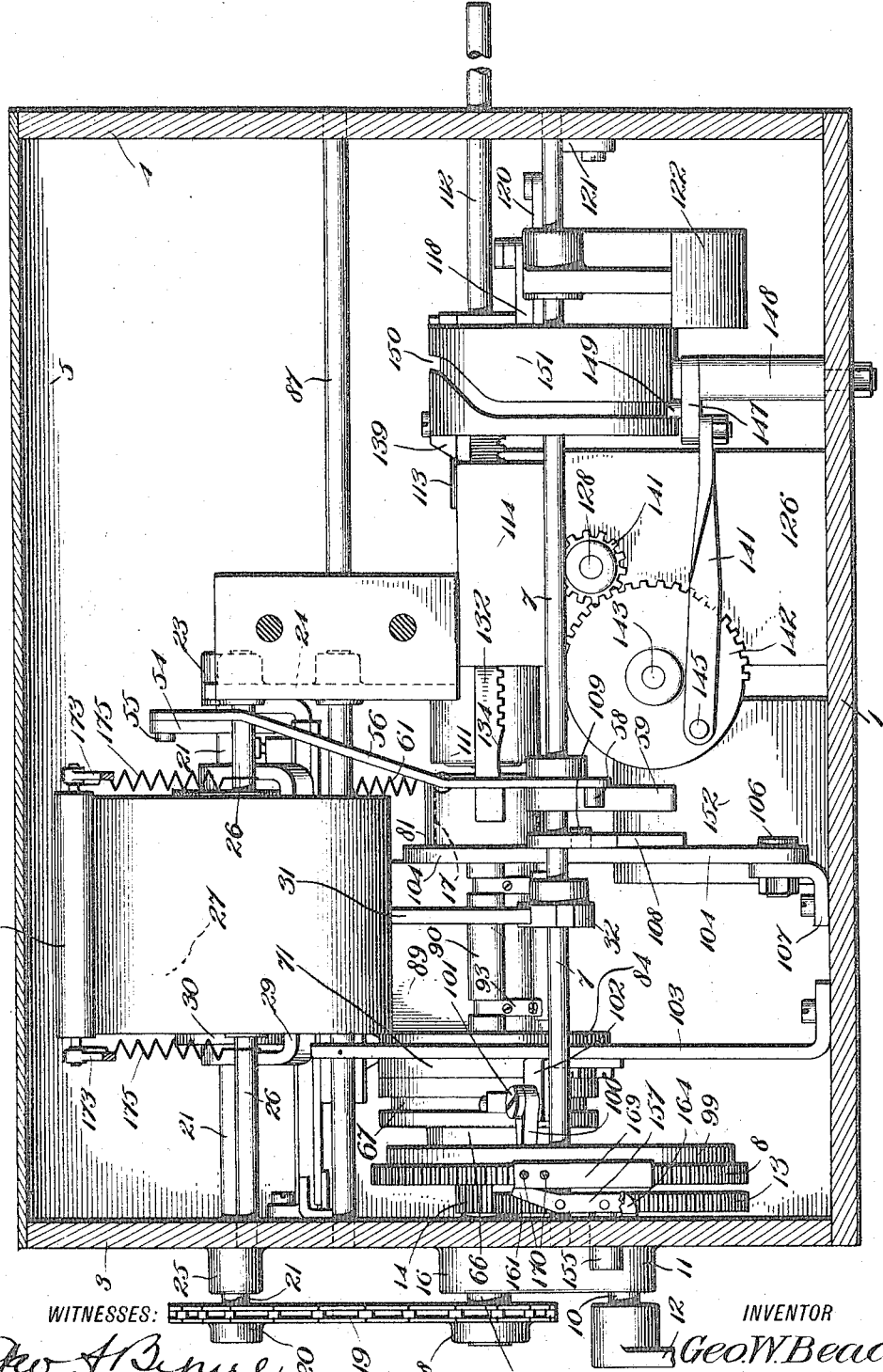

G. W. BEADLE.
MACHINE FOR MAKING PAPER CUPS.
APPLICATION FILED JAN. 30, 1912.
1,135,986.
Patented Apr. 20, 1915.
15 SHEETS—SHEET 5.
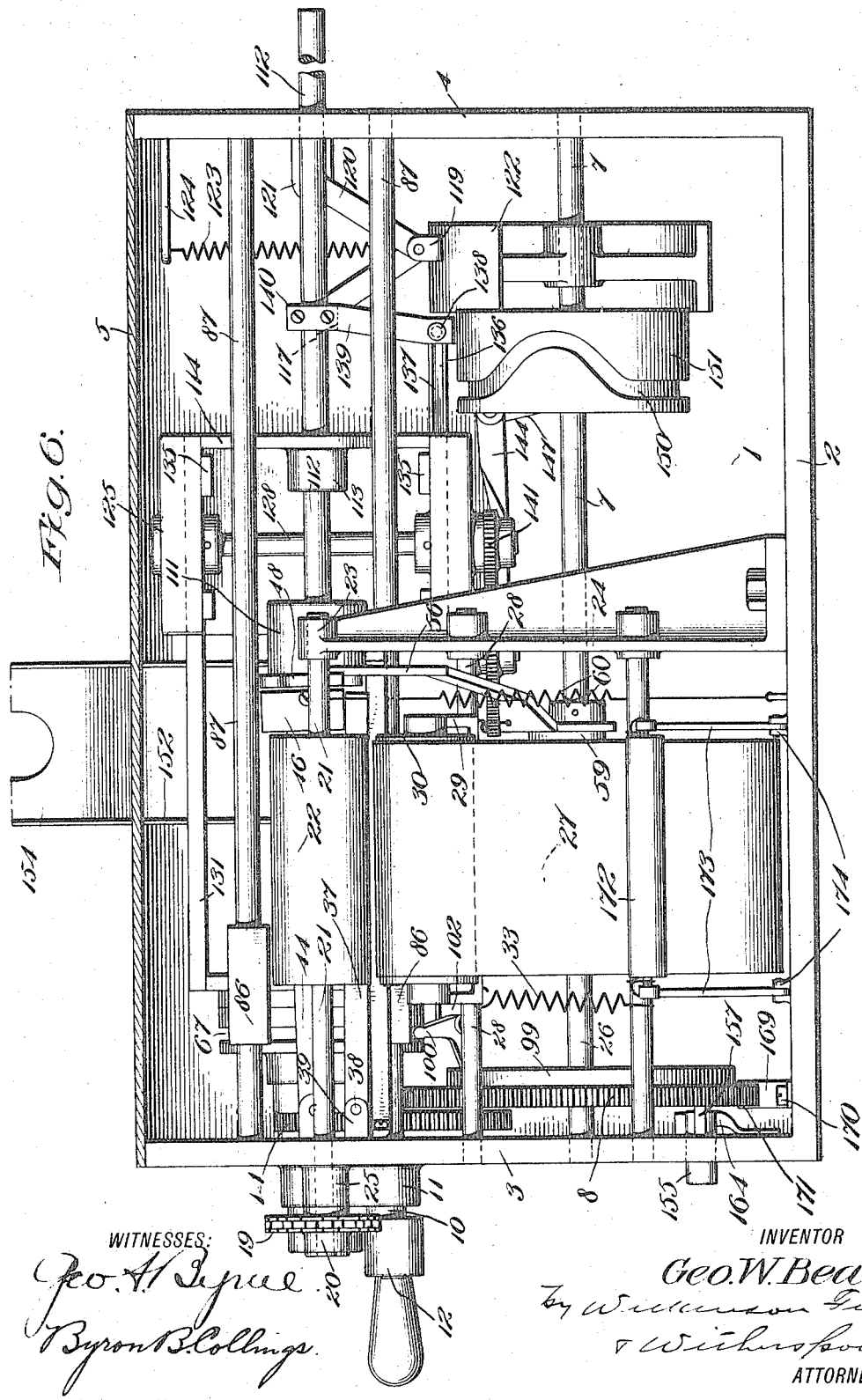
WITNESSES:
INVENTOR
Geo. W. Beadle,
ATTORNEYS

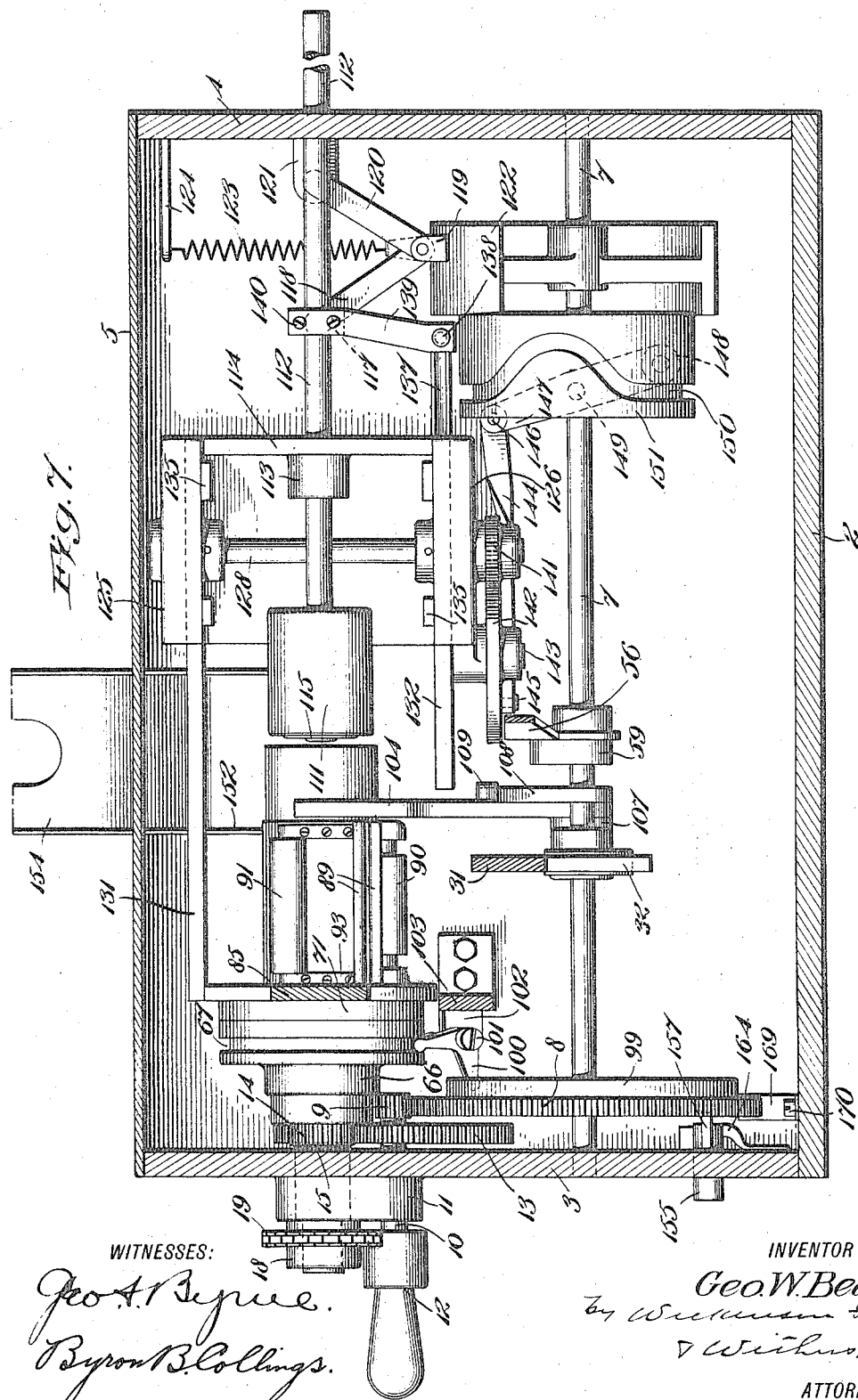

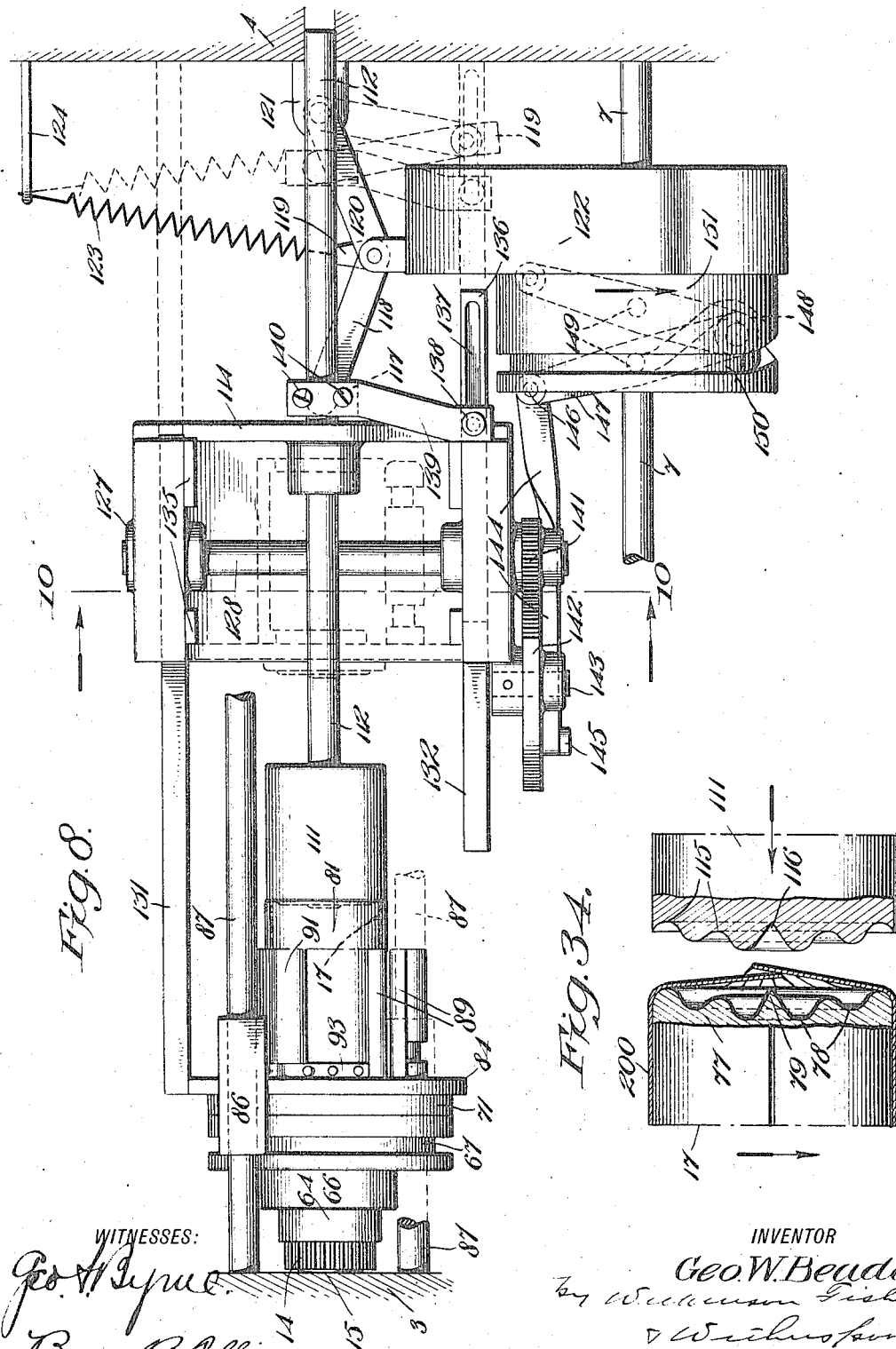

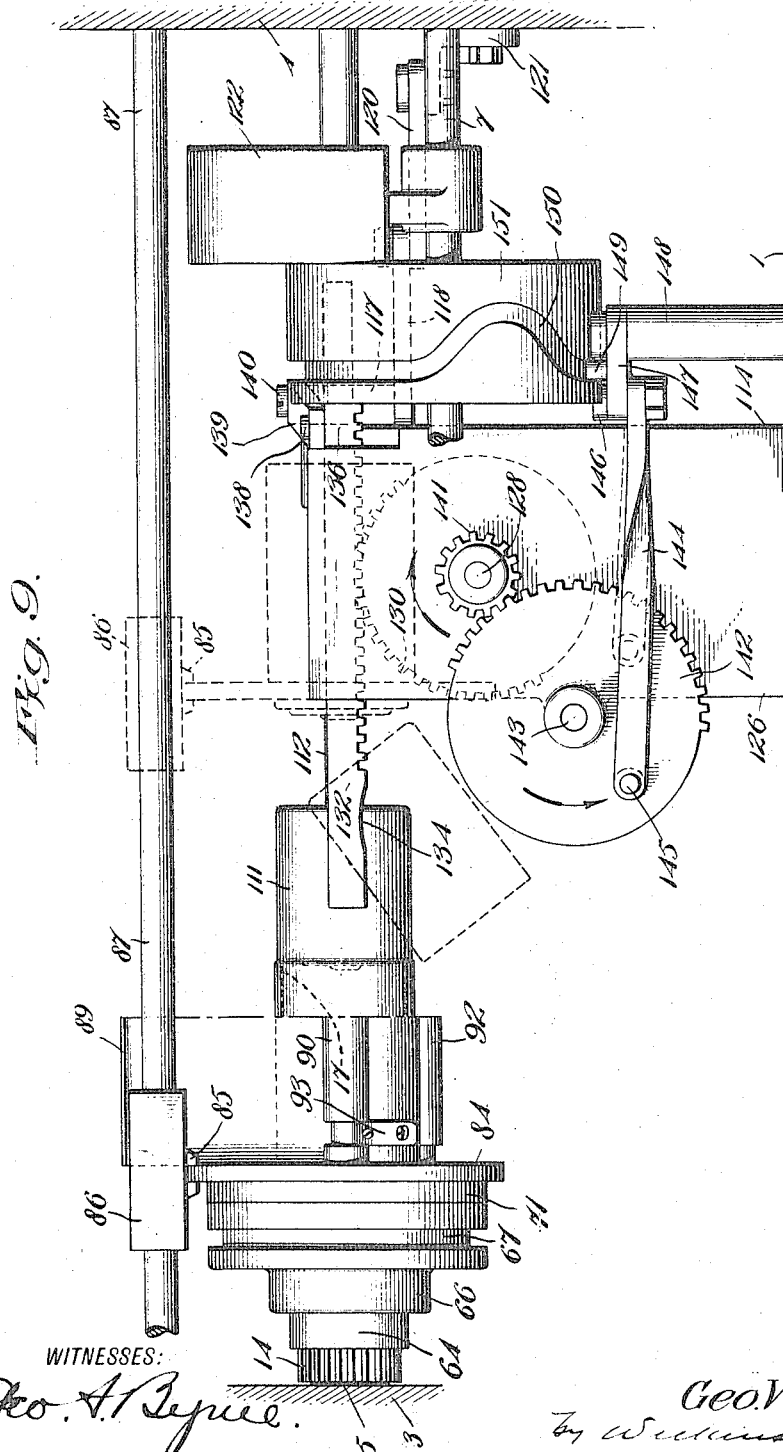

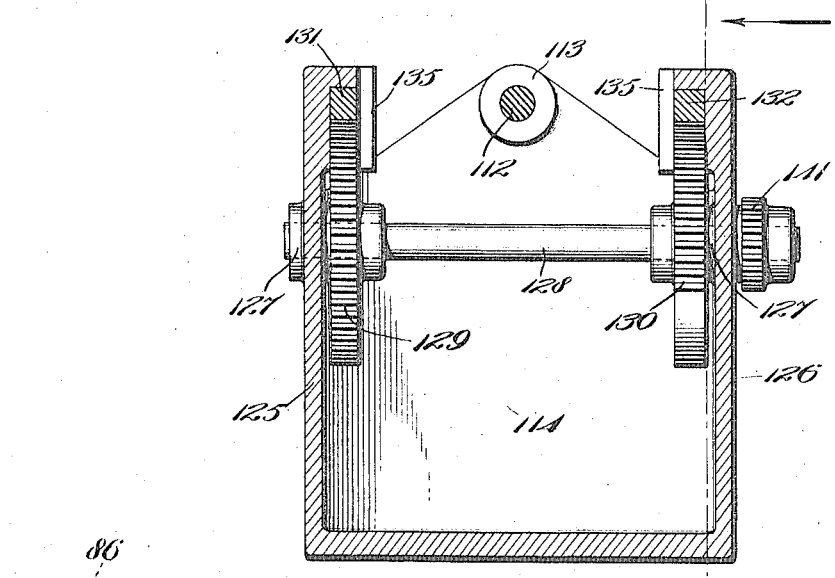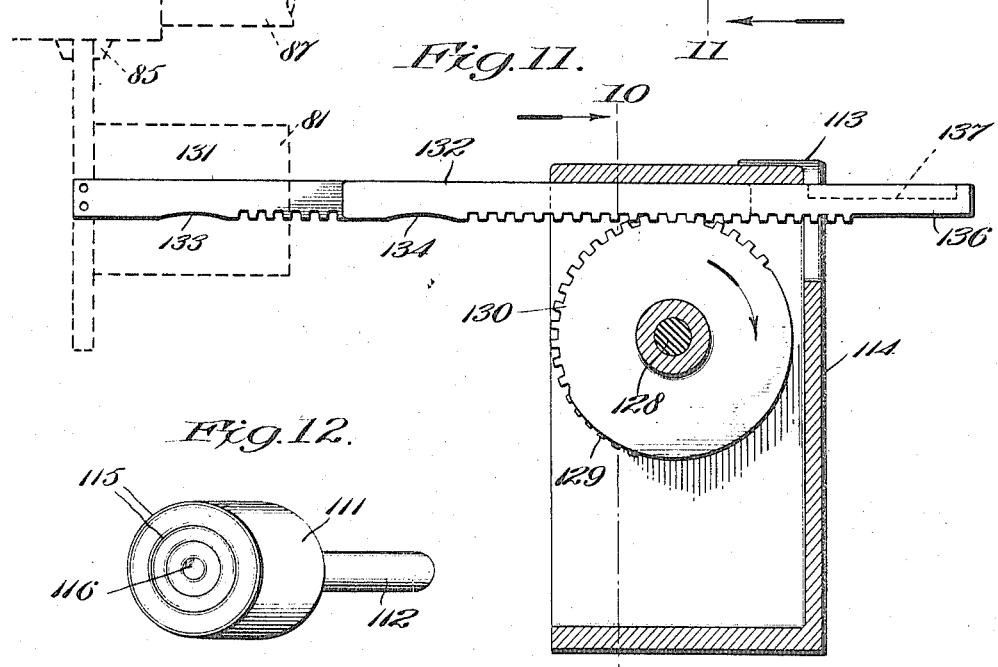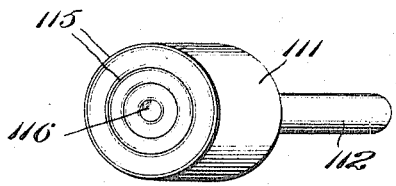

G. W. BEADLE.
MACHINE FOR MAKING PAPER CUPS.
APPLICATION FILED JAN. 30, 1912.
1,135,986.
Patented Apr. 20, 1915.
15 SHEETS—SHEET 10.
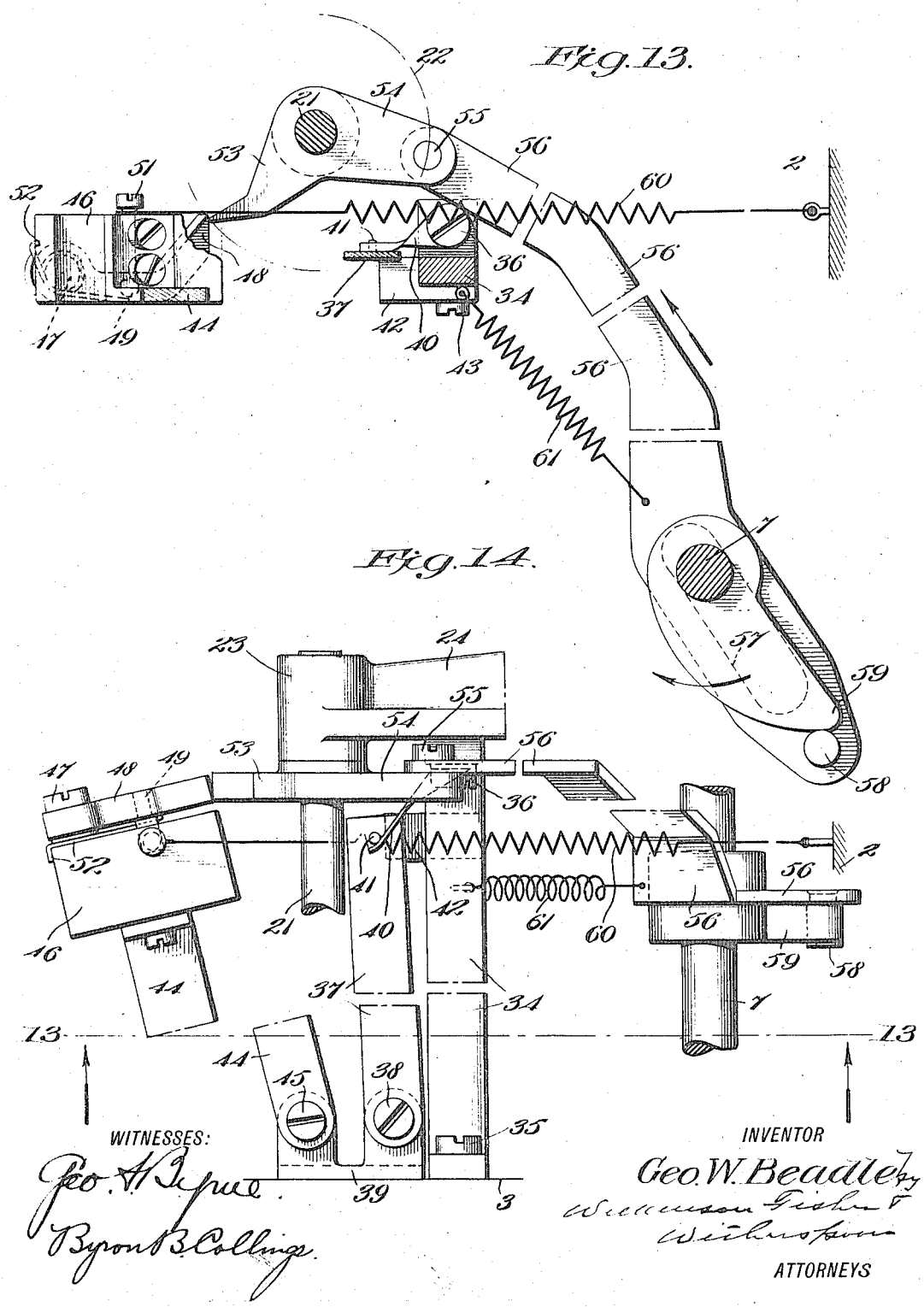

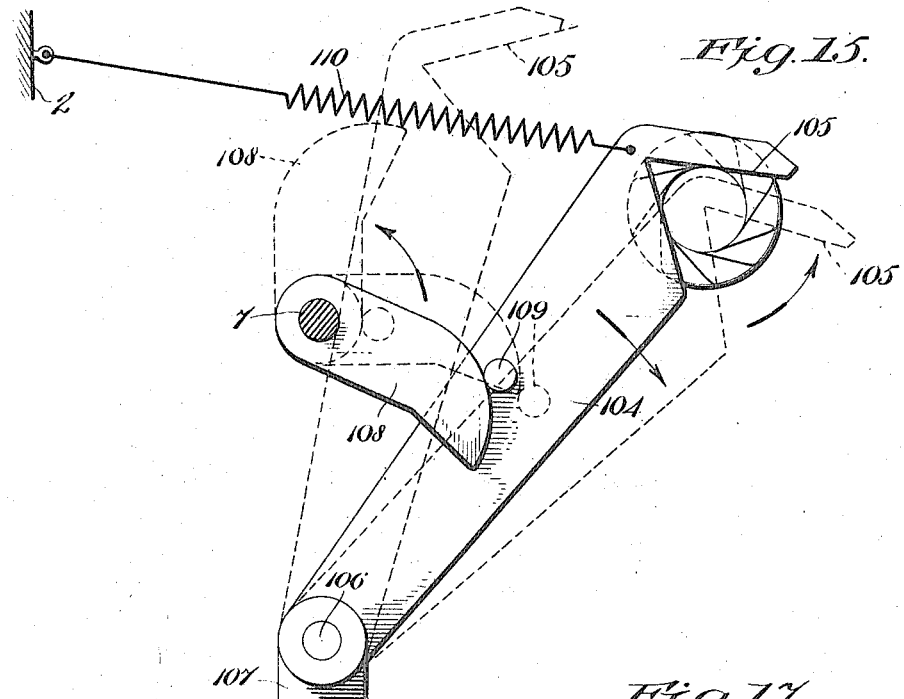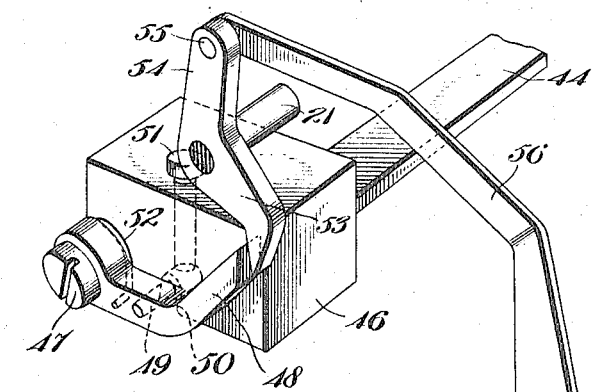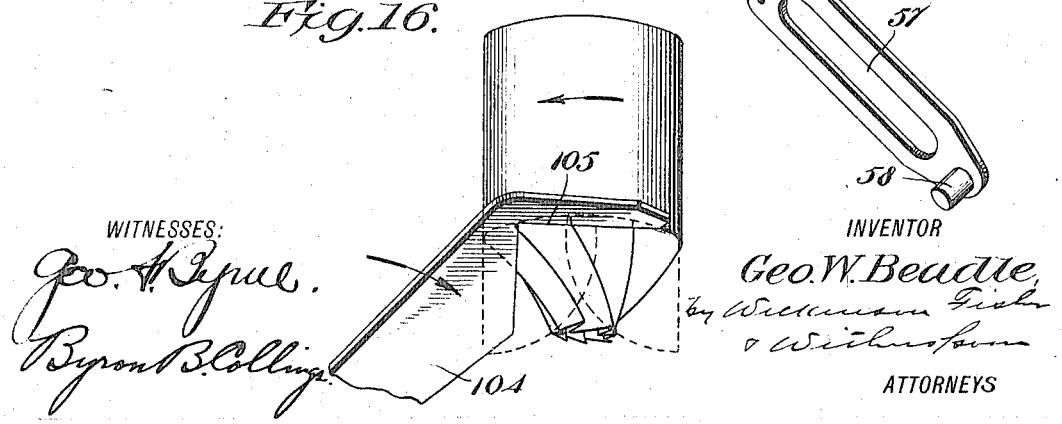

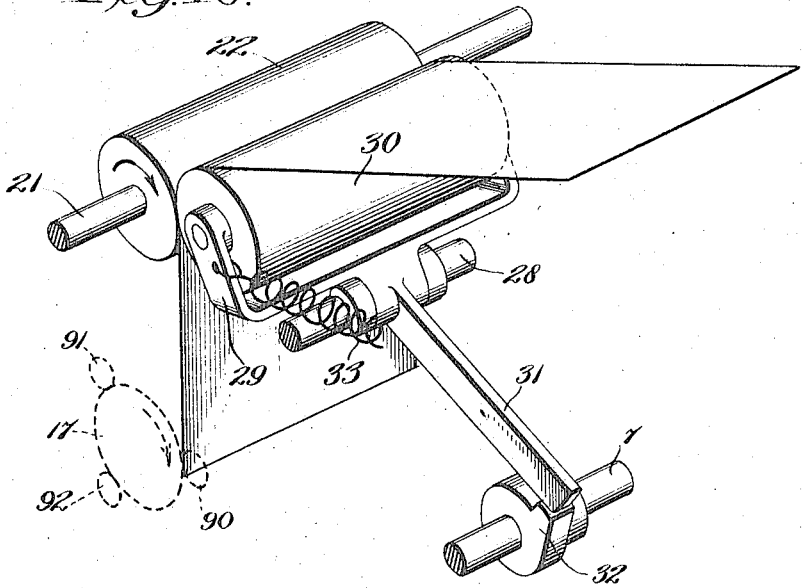
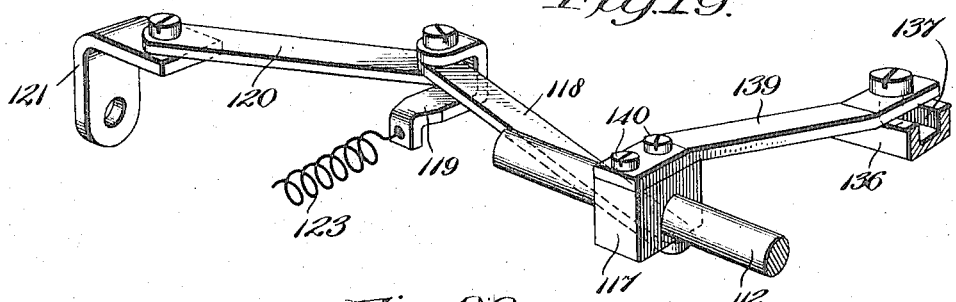
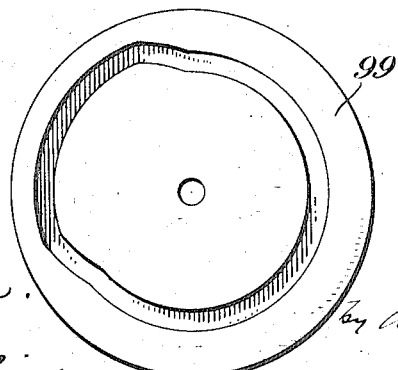

G. W. BEADLE.
MACHINE FOR MAKING PAPER CUPS.
APPLICATION FILED JAN. 30, 1912.

1,135,986.

Patented Apr. 20, 1915.
15 SHEETS—SHEET 13.

WITNESSES:
Geo. H. Byrd.
Byron B. Collings.

INVENTOR
Geo. W. Beadle,
Wilkinson Fisher &
Witherspoon
ATTORNEYS

G. W. BEADLE.
MACHINE FOR MAKING PAPER CUPS.
APPLICATION FILED JAN. 30, 1912.
1,135,986.
Patented Apr. 20, 1915.
15 SHEETS—SHEET 14.
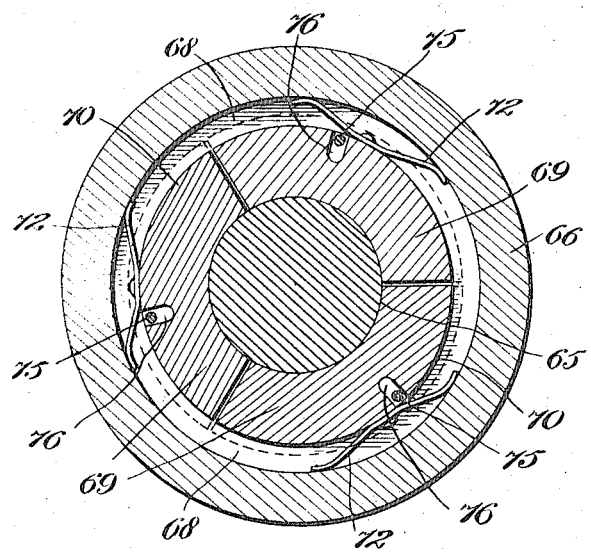
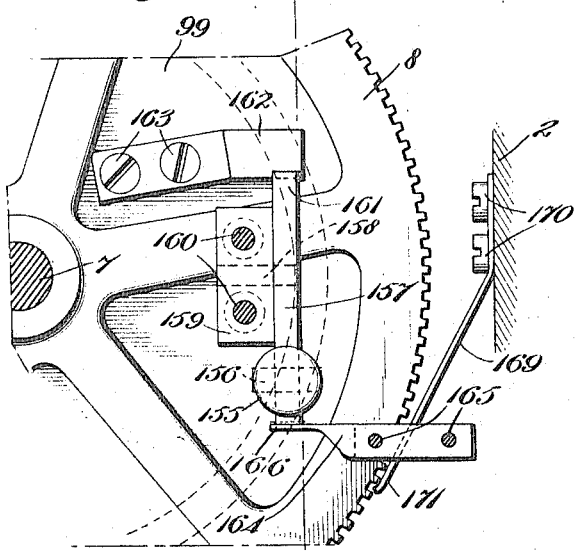
WITNESSES:
Geo. A. Byrne.
Byron B. Collings.
INVENTOR
Geo. W. Beadle, by
Wilkinson Fisher &
Witherspoon
ATTORNEYS G. W. BEADLE.
MACHINE FOR MAKING PAPER CUPS.
APPLICATION FILED JAN. 30, 1912.
1,135,986.
Patented Apr. 20, 1915.
15 SHEETS—SHEET 15.
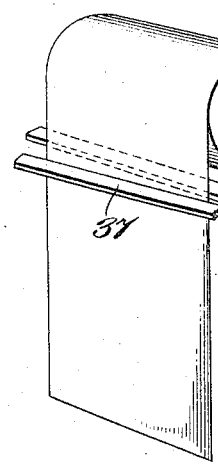
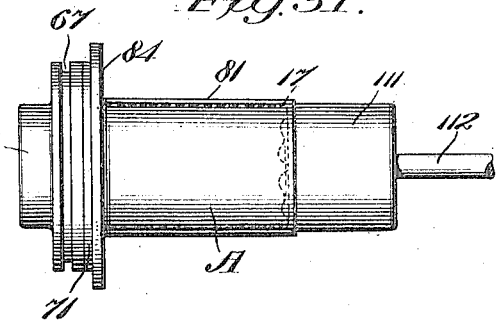
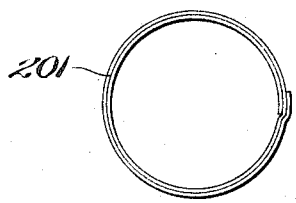
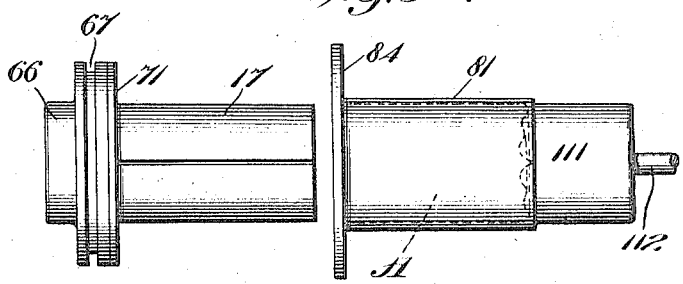
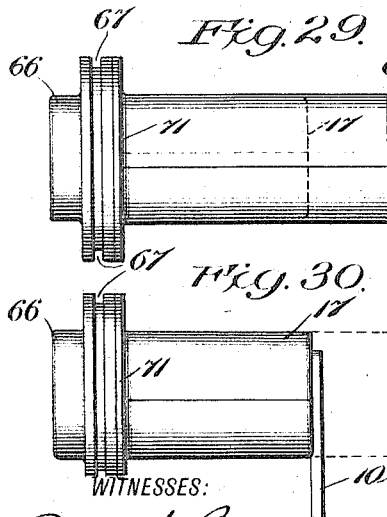
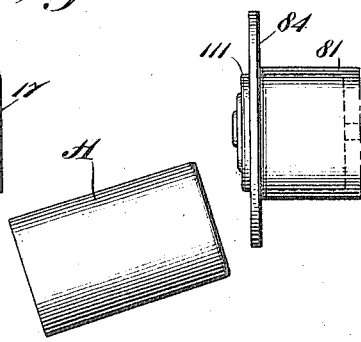
WITNESSES:
INVENTOR
Geo. W. Beadle
ATTORNEYS

UNITED STATES PATENT OFFICE.

GEORGE W. BEADLE, OF BAYONNE, NEW JERSEY.

MACHINE FOR MAKING PAPER CUPS.

1,135,986. Specification of Letters Patent. Patented Apr. 20, 1915.

Application filed January 30, 1912. Serial No. 674,333.

*To all whom it may concern:*

Be it known that I, GEORGE W. BEADLE, a citizen of the United States, residing at Bayonne, in the county of Hudson and State of New Jersey, have invented certain new and useful Improvements in Machines for Making Paper Cups; and I do hereby declare the following to be a full, clear, and exact description of the invention, such as will enable others skilled in the art to which it appertains to make and use the same.

This invention relates to machines for the manufacture of paper drinking cups, and has for its object to provide an efficient, simple, compact, and comparatively inexpensive machine that may be placed at public drinking places, and of such a character that it may be operated by hand for manufacturing and dispensing individual paper drinking cups capable of holding liquids for sufficiently long intervals of time to serve the patrons.

To these ends the invention consists in the novel details of construction and combinations of parts more fully hereinafter described and particularly pointed out in the claims, and comprising a means for convolutely winding on a collapsible mandrel a thin sheet of paraffined paper, and then forming a cup with a concave reinforced bottom, in such a manner that the cup will be liquid tight, and may rest in an upright position when placed on a table or other support.

Figure 22:
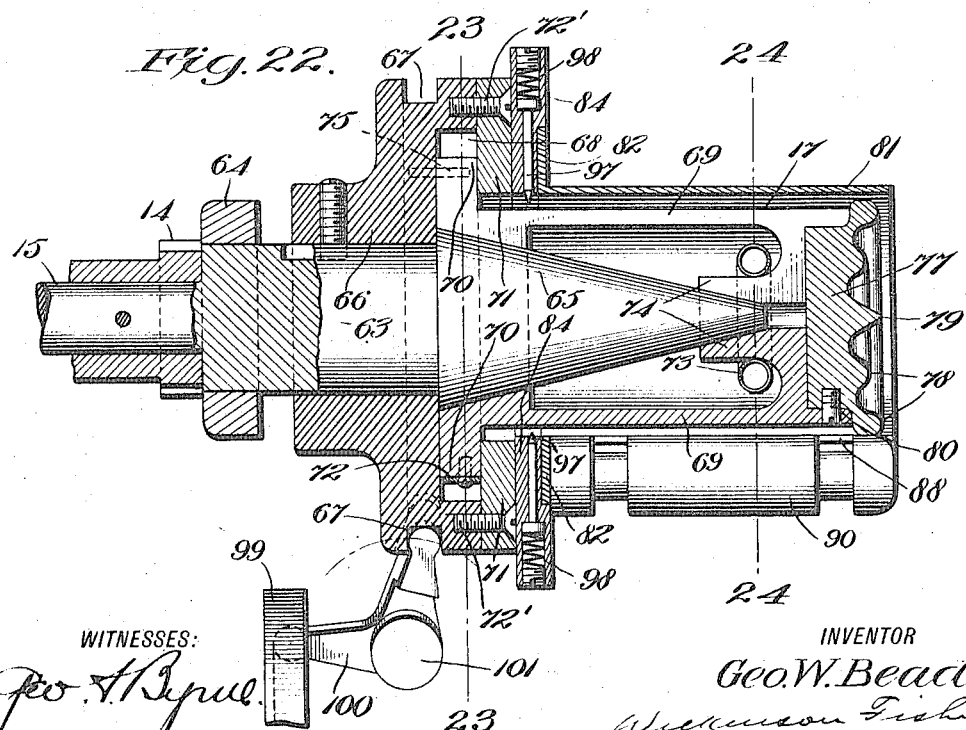

Referring to the accompanying drawings forming a part of this specification in which like numerals designate like parts in all the views:—Figure 1 is a front perspective view of a machine made in accordance with my invention; Fig. 2 is a detail view of a drinking cup made on my machine, a part being broken away for the sake of clearness; Fig. 3 is an end elevational view of my machine, looking toward the left, as seen in Fig. 1, with the end plate removed; Fig. 4 is an end elevational view looking toward the right, as seen in Fig. 1, with the end plate removed; Fig. 5 is a rear elevational view, the casing being shown in section; Fig. 6 is a top plan view of the machine with the top plate removed; Fig. 7 is a horizontal sectional view taken on the line 7—7 of Fig. 3 and looking down; Fig. 8 is a detail view of the mandrel, bottom forming die, and their operating parts; Fig. 9 is a side elevational view of the parts shown in Fig. 8; Fig. 10 is a cross sectional view taken on the line 10—10 of Figs. 8 and 11 and looking in the direction of the arrows; Fig. 11 is a cross sectional view taken on the line 11—11 of Fig. 10 and looking in the direction of the arrows; Fig. 12 is a perspective view of the bottom crimping punch; Fig. 13 is a cross sectional view of the shears and their operating parts, taken on the line 13—13 of Fig. 14 and looking in the direction of the arrows; Fig. 14 is a plan view of the parts shown in Fig. 13; Fig. 15 is a detail view of the bottom folding lever and its operating cam; Fig. 16 is a detail perspective view showing the manner of folding the bottom of a drinking cup; Fig. 17 is a detail perspective view of a part of the means for operating the shears; Fig. 18 is a detail perspective view of the paper feed rolls and their operating parts; Fig. 19 is a detail perspective view of the toggle levers for operating the bottom crimping punch; Fig. 20 is a detail view of the cam for operating the collapsible mandrel; Fig. 21 is an end view of the mandrel, mandrel sleeve, and paper guide, shown supported on the guide rods; Fig. 22 is a horizontal sectional view taken on the line 22—22 of Fig. 21; Fig. 23 is a cross sectional view taken on the line 23—23 of Fig. 22; Fig. 24 is a cross sectional view taken on the line 24—24 of Fig. 22; Fig. 25 is a detail view of the mechanism for starting and stopping the machine; Fig. 26 is a cross sectional view taken on the line 26—26 of Fig. 25; Fig. 27 is a diagrammatic perspective view of the paper feed rool and shears; Fig. 28 is an end view of a paper tube showing a number of convolutions employed in forming a paper cup on this machine; Figs. 29 to 33 are diagrammatic views showing the different steps employed in manufacturing a paper drinking cup on this machine; and, Fig. 34. Sheet 7, is a view showing the crimping punch in position to compress the paper between it and the crimping die to complete the formation of the bottom of a cup.

This machine, on which the cups may be manufactured by the patrons while placed at a public drinking place, is composed of the base plate 1, back plate 2, side plates 3 and 4, and front cover 5, all of which are securely connected together to form a casing adapted to be held to a wall or other support by the bolts 6.

During the operation of making a drinking cup, a paper feeding mechanism, a cutting mechanism, a winding mechanism, a bottom forming mechanism, and an ejecting mechanism are properly timed and brought into operation, as will now appear.

A cam shaft 7, Figs. 3, 5, 6 and 7, held in the end plates 3 and 4, has mounted near one end, a gear 8 which meshes with a pinion 9 held on the inner end of a stud shaft 10, mounted in the extended bearing 11, on the end plate 3, and carrying on its outer end a crank 12 for operating the machine when desired. A gear 13 is also mounted on the stud shaft 10, and meshes with a pinion 14 mounted on the mandrel shaft 15, mounted in an extended bearing 16, carried by the plate 3. The shaft 15 carries on its inner end a mandrel 17, Figs. 5, 8, 9, and 22, and on its outer end, a sprocket 18, over which is adapted to travel a chain 19 for transmitting power to the sprocket 20 held on the outer end of a shaft 21 carrying the paper feed roll 22, Fig. 4. The said shaft 21 is supported at its inner end by a bearing 23 mounted on the bracket 24 held to the back plate 2, and at its outer end in a bearing 25, mounted on the side plate 3, Figs. 4, 5 and 6. Mounted between the end plate 3 and the bracket 24 in suitable bearings, is a paper roll shaft 26 for supporting a roll of paper 27, Figs. 3 and 6.

28 indicates a shaft also mounted between the end plate 3 and the bracket 24 for supporting a movable yoke 29 which carries a contact paper feed roll 30. This yoke is provided at its lower end with a rearwardly extending arm 31, Figs. 4, 5 and 18, which is adapted to contact with and be operated by a cam 32, mounted on the cam shaft 7 for causing the roll 30 to contact with the feed roll 22 for forcibly feeding the paper from the roll 27 to the mandrel 17 at the proper intervals. A spring 33 connected at one end to the yoke 29 and at the other end to the paper roll shaft 26 returns the yoke to carry the contact roll 30 to its inoperative position.

After a sufficient length of paper has been fed by the feed rolls, to form the cup with a plurality of convolutions, and to allow the ends to overlap as shown in Fig. 28, the cutting mechanism is brought into operation for severing the paper into proper lengths for the mandrels. This cutting mechanism comprises a stationary shear member 34, Figs. 3, 13 and 14, rigidly held at one end by a screw 35, to the end plate 3, and at the other end by a screw 36 to the bracket 24 and a movable shear member 37 pivotally mounted at 38 to the bracket 39 held to the end plate 3. The outer or free end of the movable shear 37 is held in an open position by the spring 40, secured by the screw 36, and contacting with the pin 41, carried by said shear 37. Said free end is also supported by a bracket 42 rigidly secured by a screw 43 to the under side of the stationary shear 34.

A movable hammer bar 44 pivotally mounted at 45 to the bracket 39 carries on its outer end a hammer head 46 on the outer side of which is pivotally mounted, as at 47, a trip finger 48. This trip finger carries on its inner side a pin 49, which is adapted to travel within the recess 50, Fig. 17, on the under side of the hammer head 46, and to contact with the adjusting screw 51, also held in the hammer head 46. A spring 52 is adapted to always hold the pin 49 in contact with the adjusting screw 51.

Pivotally mounted on the shaft 21 and adapted to contact with the trip finger 48 is a pawl 53, the arm 54 of which is pivotally connected as at 55 to the upper end of an operating rod 56. The lower end of this operating rod slides and is guided on the cam shaft 7 by its slot 57 when the pin 58 carried by said lower end, contacts with the cam 59 mounted on the said cam shaft 7. When the pawl 53 is operated by the cam 59 through the said operating rod 56, it causes the movable hammer bar 44 carrying the hammer head 46 to so move as to tension the spring 60 until the end of the pawl 53 passes the end of the trip finger 48, whereupon the hammer head is released, and under tension of the said spring 60, is caused to strike the movable shear 37 and to sever the paper, which has been previously fed between said shears 34 and 37, see Fig. 3. After the cam 59 has passed the pin 58, the operating rod 56 is moved longitudinally of its slot 57 and returned to its initial position by the action of the spring 61, the ends of which are connected to the said operating rod 56 and the stationary bar 34, as shown. The pawl 53 in returning to its normal position swings on the shaft 21 as a pivot, and passes the trip finger 48, putting under tension the spring 52, which immediately returns said finger 48 to its normal position. Through the adjusting screw 51 the point of contact between the trip finger 48 and the pawl 53, can be accurately adjusted thereby regulating the exact time of tripping, and therefore, the length of the paper to be severed. After a proper length of paper has been provided by the cutting mechanism just described, it is wound on the mandrel 17 by the mechanism now to be disclosed.

The inner end of the mandrel shaft 15, on which the mandrel 17 is mounted, is provided with an enlargement 63 Fig. 22, and said enlargement carries on one end a collar 64, while on the other end, there is formed a cone 65. Slidably mounted on the enlargement 63 is a sleeve 66 which is provided with a circular groove 67 and a recess 68.

Held within the recess 68 and adapted to slide on the cone 65 are three collapsible segments 69 constituting the mandrel 17, Figs. 22, 23 and 24. These segments are provided on their inner ends with flanged portions 70 against which fits a retaining plate 71 held by the screw 72' to the sleeve 66 for retaining the said segments 69 in their proper positions.

Flat springs 72 rigidly held on the outer ends of the flanged portions 70, and a coil spring 73 surrounding the inner flanges 74 of the collapsible segments 69, keep the segments in contact with the cone 65. The collapsible segments are held against rotation on the cone 65 by the pins 75, Fig. 23, which are carried by the sleeve 66, working in the slots 76, cut in the extended flanged portions of said segments.

A concave crimping die 77 provided with a series of corrugations 78 terminating in a central cone 79 is held by pins 80 to the outer ends of the collapsible segments 69.

A mandrel sleeve 81 provided with a flange 82 is held by the screws 83, Fig. 21, to a plate 84 which plate is suspended from a carriage 85 provided in the bearings 86. This carriage carrying the mandrel sleeve 81, is adapted to travel on the guide rods 87 held in the side plates 3 and 4 of the machine. The sleeve 81 is adapted to surround the mandrel and crimping die when in the winding position Fig. 22, and is provided with a slot 88, Fig. 21, through which the paper is guided to the mandrel 17 from the paper guides 89, mounted on the plate 84.

Contact roller 90, 91, and 92 held on the mandrel sleeve 81 by the springs 93 are adapted to contact through the slots 88, 94 and 95 with the collapsed segments of the mandrel 17 when they are in an expanded position, see dotted lines Fig. 24, and guide the paper 200 within the mandrel sleeve around the mandrel when winding the tube. The tension on the springs 93 for regulating the pressure of the contact rollers 91 and 92 may be regulated by the adjusting screws 96.

Spring pressed pins 97, Fig. 22, mounted in recesses 98, within the plate 84, are adapted to project a slight distance within the mandrel sleeve for engaging the end of the finished cup and sliding it off of the mandrel when the ejecting mechanism is brought into operation, as will be hereinafter described.

The segments 69 of the mandrel are held in the expanded position during the complete cycle of making a cup, by the action of a cam 99, mounted on the cam shaft 7, Figs. 22 and 26, operating the cam lever 100. This cam lever is pivotally mounted as at 101 on a bracket 102, held to the upright bracket 103, Figs. 5 and 7, for working in the circular groove 67 of the slidable sleeve 66, Figs. 5, 7 and 22, and causes the cam 65 to force outwardly the segments 69, as will be readily understood. The paper is of sufficient width to extend beyond the end of the mandrel segments, Figs. 16 and 34, so that the end of the formed tube may be overlapped to form the bottom of the cup, as shown in Fig. 2.

So far as has now been disclosed, it will be clear if the lever 12 is turned, the shaft 10 will cause the pinion 9 to turn the gear 8, and the gear 13 to turn the pinion 14, sprocket 18, sprocket chain 19, sprocket 20, shaft 21, and paper feed roll 22, carried by said shaft. Further, the turning of the gear 8 will cause the shaft 7 to revolve, which carries the cam 32, adapted to contact with the extension 31 on the yoke 29. The action of the cam 32 will therefore cause the said roll 30 to periodically carry the paper 200 into contact with the feed roll 22, and thereupon permit said feed roll to force said paper downwardly through the guides 89. Located immediately above said guides, however, are the shears 34 and 37, and the parts are so timed that the latter automatically cut said paper into proper lengths for forming a tube 201 on the mandrel 17 located immediately below said guides 89. That is to say, the paper 200 is fed by said guides, Fig. 24, to a point between the roller 90 and the said mandrel when in its expanded condition, after the shears 34 and 37 have been operated through the medium of the rod 56 and hammer 44, the said rod being itself operated by means of the cam 57, carried by the rotating shaft 7. And after said paper reaches said roller 90, the mandrel being rotated through the medium of the pinion 14 and shaft 15, the said paper 200 is passed by said mandrel successively under the rollers 92 and 91, and thereupon convolutely wound into a tube. The said paper, however, is chosen of a width to extent beyond the free end of said mandrel a distance sufficient to permit a bottom to be formed on said tube out of said extending paper by the mechanism now to be described. A bottom folding lever 104, Figs. 4, 7 and 15, provided at its upper end with an opening 105, is pivotally mounted at 106 to a bracket 107 held to the base plate 1.

A cam 108 mounted on the cam shaft 7 contacts with a pin 109 held on the side of the bottom folding lever and as the mandrel revolves, forces it into contact with that part of the paper that extends beyond the end of said mandrel, thereby folding it inward over the crimping die of said mandrel, as illustrated in Figs. 15 and 16, and thereby partially forming said bottom. After the said cam 108 has passed the pin 109, a spring 110, Figs. 4 and 15, held at one end to the upper end of the bottom folding lever and at the other end to the back plate 2, returns the lever 104 to its initial position.

Immediately following the operation of folding the end of the paper over the end of the mandrel and die, Fig. 34, Sheet 8, the crimping punch 111, Fig. 8, mounted on the shaft 112, slidably held in the side plate 4 and in the bearings 113 on the bracket 114 is brought into operation to complete the formation of the bottom of the tube or cup by the mechanism that will now be described. The face of this crimping punch 111 is of convex form, as shown, and is provided with a series of corrugations 115 terminating in an inverted cone 116, which are complementary to like parts on the die 77.

Rigidly connected to the shaft 112, is a block 117, Figs. 4, 6, 7, 8 and 19, to the underside of which is pivotally connected one end of a toggle lever 118 the other end of which is connected to a cam following member or block 119. A second toggle lever 120 is also connected at one end to the cam following block 119 and at its other end to a bracket 121, held to the side plate 4 of the machine.

A cam 122 mounted on the cam shaft 7 is adapted to actuate the said block 119 and through the toggle levers 118 and 120 force the crimping punch 111 from its position of rest, as shown in Figs. 6 and 7, in to its crimping position, as shown in Figs. 8, 9 and 31, thereby compressing the paper between it and the crimping die 77 and completing the formation of a bottom for the paper cup of a concave corrugated shape, as shown in Fig. 2.

A light spring 123, Fig. 7, which has one end connected to the cam following block 119, and the other end to a rod 124, held in the side plate 4, is adapted to hold the face of the block in proper relation to the face of the cam 122, as will be clear from the drawings. The cup A after being completed on the mandrel, is ejected by the mechanism now to be described. The bracket 114, Figs. 5, 6, 7 and 10, mounted on the base plate 1 is provided with the side plates 125 and 126 in which is journaled in bearings 127 a shaft 128.

Mounted on the shaft 128, on the inside of the plates 125 and 126 are two intermittent gears 129 and 130, Figs. 10 and 11, which are adapted to actuate racks 131 and 132 provided with the rest portions 133 and 134. These racks are held above the gears 129 and 130 to the upper portions of the side plates 125 and 126 by the guide stays 135, the rack 131 being of greater length than the rack 132 and connected to the carriage 85, Figs. 6, 7, 8 and 11, for sliding the latter along the guide bars 87 when removing the cup from the mandrel as will be hereinafter described.

The rack 132 is provided with a rearward extending portion 136, having a slot 137 in which is adapted to travel a pin 138 held in the end of a rod 139, the other end of which is rigidly connected by the screws 140 to the top side of the block 117, held on the shaft 112. As will appear hereinafter, the function of this slot and pin connection is to return the shaft 112 and crimping punch, after the bottom of the cup has been finished, and at the same time the cup is stripped from the mandrel through the rearward motion of the rack 132. Mounted on the end of the shaft 128 on the outside of the side plate 126, is a pinion 141 which is adapted to mesh with a gear 142 held on a stud 143 mounted in the side plate 126.

144 indicates a link pivotally connected at 145 to the gear 142 and at 146 to one end of a cam lever 147. This cam lever 147 is supported on its other end by a stud 148 held to the base plate 1, and carries a cam pin 149 which travels in a cam groove 150 cut in the cam 151 mounted on the cam shaft 7.

Immediately after the cam 122 has caused the crimping punch 111 to move forward and perform its function, the cam 99 through the medium of the lever 100 and slot 67 collapses the mandrel 17, Fig. 22, by forcing the cone 65 toward the left, as seen in said figure, and immediately following these movements the cam 151 through the cam lever 147 actuates the link 144 which through the gears 142, 141 and intermittent gears 129 and 130 move the racks 131 and 132 rearwardly, as shown in dotted lines in Fig. 8.

The rack 131 with the carriage 85, plate 84, mandrel sleeve 81 connected thereto and pins 97, removes the finished cup A from the collapsed mandrel and carries it within the said sleeve from the position shown in Fig. 31 to that shown in Fig. 32. The rack 132 moving in unison with the rack 131 causes the crimping punch 111, by means of the rod 139 to also move backward with said sleeve, as indicated by dotted lines, Figs. 8 and 9. The backward movement of the punch is stopped, however, by the rest portion 134 on the rack 132 engaging with the rest portion on the gear 130. But, the movement of the shaft 128, carrying the gear 129 causes the rack 131 to further continue its backward movement to the ejecting position, wherein the sleeve is forced over the now stationary punch and the cup forced out, as shown in Fig. 33 and indicated in dotted lines in Figs. 8 and 9. The rest portion 133 on the rack 131 now engages with the rest portion of the gear 129 and said rack becomes stationary. But, the continued rotation of the cam 151, reverses the movements of the racks 131 and 132, through the cam lever 147, the link 144, gears 142, 141, and intermittent gears 129 and 130, thereby carrying the mandrel sleeve 81, and the racks back to their initial or winding positions. Further, since the crimping shaft 112 is connected by the rod 139 to the rearwardly extending portion 136 of the rack 132, the crimping punch 111, is likewise returned to its initial or rest position shown in Figs. 6 and 7. After the cup A has been ejected by the action of the crimping punch pushing it out of the mandrel sleeve, as disclosed above, it falls down into the chute 152 and is delivered through the opening 153 in the casing 5 to the receiving tray 154.

A push button 155 mounted in the side plate 3, Figs. 1, 3, 5, 6, 7, 25 and 26, is provided for releasing the mechanism to start the machine. This button is pivotally connected as at 156 to a trigger 157 pivotally mounted at 158 to a block 159 held by the screws 160 to the inner face of side plate 3. The trigger 157, preferably of the shape shown in Fig. 26, is provided with an upper end 161, which is adapted to coöperate with a lug 162, secured by the screws 163 to the cam 99, and to thereby hold the mechanism in a locked position.

A spring 164, held by the screws 165 to the inner face of side plate 3, is provided with a raised portion 166 which is adapted to coöperate with the notches 167 and 168 in the lower end of the trigger 157, and hold the same in either the locked or unlocked position.

When the push button is pushed in to start the machine, the raised portion 166 on the spring 164 engages in the notch 168 on the lower end of the trigger and holds the same in an unlocked position, as shown by dotted lines in Fig. 26. This movement of the push button also releases the upper end 161 of the trigger from engagement with the lug 162, and allows the crank shaft 7 to be operated by the crank 12, as has been previously disclosed.

During the early rotation of the cam 99, the lug 162 contacts with the lower part of the trigger, should it be in the path of said lug, and returns the same to its locking position, whereupon said trigger is again held in said locking position by the raised portion 166 on the said spring 164 engaging with the notch 168. Therefore, after the cam 99 carrying the lug 162 has made one complete turn, the lug 162 will in all cases, again contact with the upper end of the trigger, and lock the machine. The locking trigger 157 thus prevents the crank 12 from being turned in one direction when the button is not pressed, and a spring stop 169 having one end held by the screws 170 to the back plate 2 and its other end 171 contacting with the gear 8, Figs. 3 and 25, prevents the crank from being turned in the other direction.

A friction roller 172, Figs. 3, 4, 5 and 6, supported by rods 173 pivotally mounted at 174 to the back plate 2 is adapted to contact with the paper roll 27 and prevent any slack in the paper between said roll and the feed rolls 22 and 30. Springs 175 connected at one end to the friction roller shaft and at the other end to the paper roll shaft 26, serve to hold the friction roller 172 in close contact with the paper roll 27.

The operation of the machine is as follows:—A person desiring to secure a cup, first pushes in on the push button 155 and trips the trigger to the dotted position shown in Fig. 26. This movement disengages the upper end 161 of said trigger from the lug 162 mounted on the cam 99, and leaves the crank 12 free to turn. The crank now being turned to the left, transmits motion to the crank shaft through the pinion 9 meshing with the gear 8. Through the gear 13 meshing with the pinion 14, mounted on the mandrel shaft, the mandrel is revolved, and through the sprocket 18 mounted on the end of the mandrel shaft, chain 19, and sprocket 20, mounted on the shaft 21, the driving paper feed roll is revolved, all as above set forth. The contact feed roll is next brought into contact with the driving feed roll by the action of cam 32, and after a proper length of paper has been fed, it is then severed by the cutting mechanism which is actuated by the cam 59. The severed paper is then wound on the mandrel within the mandrel sleeve, while a part of the wound paper extends beyond the ends of the mandrel and mandrel sleeve, and the mandrel is held in an expanded position through the action of the cam lever 100 coacting with the cam 99, all as has been likewise explained above. The bottom folding lever 104 is next brought into operation by the action of the cam 108 and that part of the paper which extends beyond the end of the mandrel, and sleeve is folded over the mandrel end and die carried thereby in a neat and compact manner. While this movement is taking place, the cam 122, is through the toggle levers and shaft 112, slowly advancing the crimping punch. Immediately after the bottom folding lever has returned to its initial position, the cam 122 forces the crimping punch into the crimping position, thereby compressing the paper between it and the rapidly revolving crimping die, mounted on the end of the mandrel. This completes the formation of a paper cup with a concave corrugated bottom. Immediately following the formation of the bottom of the cup, the mandrel is collapsed by the action of the cam lever 100, coacting with the cam 99, and the cam 151 actuates the cam lever 147, which, through the connected link and gears, operates the racks 131 and 132. The operation of these racks cause both the mandrel sleeve and the crimping punch to move together rearwardly, stripping the paper cup off of the collapsed mandrel, and holding it within the mandrel sleeve until it reaches the ejecting position. Upon reaching this position, the crimping punch remains stationary and the mandrel sleeve continues on, thereby forcing the cup out of the mandrel sleeve when it falls into the chute and is delivered to the receiving tray. The continued movement of the cam 151 returns the mandrel sleeve and crimping punch to their initial positions and the cam 99 returns the collapsed mandrel to its expanded position, ready for a subsequent operation. After the operating crank has been turned the necessary number of times to complete the making of a cup, the machine is automatically brought to a stop by the lug 162 contacting with the upper end of the trigger, and the machine is automatically locked against further operation until the push button is again operated.

It is obvious that those skilled in the art may vary the details of construction and arrangement of parts without departing from the spirit of my invention, and therefore, I do not wish to be limited to the above disclosure except as may be required by the claims.

What I claim is:—

1. In a machine for making paper cups, the combination of a power shaft; a mandrel shaft parallel to said power shaft; connections between said shafts; a mandrel parallel to said power shaft adapted to wind paper into a tube on said mandrel shaft; a roll carrying paper; means to feed the paper to said mandrel; connections between said mandrel shaft and said feeding means; means to sever the paper from said roll into predetermined lengths before it is wound on said mandrel; means associated with said mandrel adapted to form a bottom from an integral portion of said tube; manually operable means for actuating said parts; and automatic means for stopping the operation after a cup has been finished, substantially as described.

2. In a machine for making paper cups, the combination of a power shaft; a cam shaft; a mandrel shaft; connections between said shafts; a mandrel adapted to wind paper into a tube on said mandrel shaft; a roll carrying said paper; means to feed said paper intermittently to said mandrel; connections between said mandrel shaft and said paper feeding means; means actuated from said cam shaft to sever the paper into predetermined lengths before it is wound on said mandrel; means connected with said cam shaft adapted to form a bottom from an integral portion of said tube while the latter is on said mandrel; a hand operated lever for actuating said power shaft; and automatic means for stopping the operation after a cup has been finished, substantially as described.

3. In a machine for making paper cups, the combination of a power shaft; manually operated means for actuating said shaft; a cam shaft; a mandrel shaft; driving connections between said shafts; a roll carrying paper; a mandrel adapted to wind said paper into a tube on said mandrel shaft; means to feed said paper to said mandrel; a cam on said cam shaft; a connection between said paper feeding means and said cam; means to sever the paper into predetermined lengths before it is wound on said mandrel; means associated with said mandrel adapted to form a bottom from an integral portion of said tube; connections between said cam shaft and said last mentioned means, and means rendering the mechanism inoperative after a single cup has been formed, substantially as described.

4. In a machine for making paper cups, the combination of a power shaft; a mandrel shaft carrying a mandrel adapted to wind the paper into a tube; a feed roll shaft carrying a paper feed roll; a cam shaft carrying a cam; connections between said shafts by which they may be each operated from said power shaft; a movable roll on which the paper to be operated upon is passed; a connection between said movable roll and said cam; a severing mechanism; means associated with said mandrel for forming a bottom for the cup out of an integral portion of said tube, connections between said cam shaft and said last mentioned means; and means rendering the machine inoperative after a single cup has been formed, substantially as described.

5. In a machine for making paper cups, the combination of a power shaft; a mandrel shaft carrying a mandrel adapted to wind the paper into a tube; a feed roll shaft carrying a paper feed roll; a cam shaft carrying a cam; connections between said shafts by which they may be each operated from said power shaft; a movable roll over which the paper to be operated upon is passed; a connection comprising a pivoted lever between said movable roll and said cam; a severing mechanism; a guide for said paper adjacent said severing mechanism for delivering the same to said mandrel; means associated with said mandrel for forming a bottom for the cup out of an integral portion of said tube, connections between said cam shaft and said last mentioned means; and means rendering the machine inoperative after a single cup has been formed, substantially as described.

6. In a machine for making paper cups, the combination of a manually operating means; a power shaft connected to said means carrying a gear and a pinion; a mandrel shaft carrying a mandrel and provided with a pinion meshing with said gear; a paper feed roll driven from said mandrel shaft; a cam shaft provided with a gear meshing with said first mentioned pinion; a movable roll over which the paper passes adapted to contact at intervals with said paper feed roll; a cam on said cam shaft; a yoke in which said movable roll is mounted provided with an extension adapted to contact with said cam; a paper guide for delivering the paper to said mandrel; a severing means adapted to cut the paper into predetermined lengths, and means rendering the machine inoperative after a single cup has been formed, substantially as described.

7. In a machine for making paper cups, the combination of a manually operating means; a power shaft connected to said means carrying a gear and a pinion; a mandrel shaft carrying a mandrel and provided with a pinion meshing with said gear; a paper feed roll driven from said mandrel shaft; a cam shaft provided with a gear meshing with said first mentioned pinion; a movable roll over which the paper passes adapted to contact at intervals with said paper feed roll; a cam on said cam shaft; a yoke in which said movable roll is mounted provided with an extension adapted to contact with said cam; a paper guide for delivering the paper to said mandrel; a severing means adapted to cut the paper into predetermined lengths; and means to automatically lock the machine after said power shaft has made a predetermined number of revolutions, substantially as described.

8. In a machine for making paper cups, the combination of a manually operating means; a power shaft connected to said means carrying a gear and a pinion; a mandrel shaft carrying a mandrel and provided with a pinion meshing with said gear, a paper feed roll driven from said mandrel shaft; a cam shaft provided with a gear meshing with said first mentioned pinion; a movable roll over which the paper passes adapted to contact at intervals with said paper feed roll; a cam on said cam shaft; a yoke in which said movable roll is mounted provided with an extension adapted to contact with said cam; a paper guide for delivering the paper to said mandrel; a severing means adapted to cut the paper into predetermined lengths; and means comprising a pivoted trigger and lug adapted to automatically lock the machine after the power shaft has made a predetermined number of revolutions, substantially as described.

9. In a machine for making paper cups, the combination of a manually operating means comprising a handle; a power shaft connected to said means carrying a gear and a pinion; a mandrel shaft carrying a mandrel and provided with a pinion meshing with said gear; a paper feed roll driven from said mandrel shaft; a cam shaft provided with a gear meshing with said first mentioned pinion; a movable roll over which the paper passes adapted to contact at intervals with said paper feed roll; a cam on said cam shaft; a yoke in which said movable roll is mounted provided with an extension adapted to contact with said cam; a paper guide for delivering the paper to said mandrel; a severing means adapted to cut the paper into predetermined lengths, means comprising a spring, a pivoted trigger and a lug for automatically locking the machine after the power shaft has made a predetermined number of revolutions; and means coacting with said trigger adapted to unlock said machine, when desired, substantially as described.

10. In a machine for making a paper cup, the combination of a roll carrying paper; a mandrel adapted to wind said paper into a tube; means for operating said mandrel; means for severing said paper into predetermined lengths before being wound on said mandrel; means for forming a bottom for said cup out of an integral portion of said tube; a hand operated power shaft for operating each of said means, and means for automatically locking the machine after each cup is formed, substantially as described.

11. In a machine for making a paper cup, the combination of a hand operated power shaft; a roll of paper; a mandrel and connected mechanism adapted to form said paper into a tube; means associated with said mandrel adapted to form a corrugated bottom for said cup from an integral portion of said tube; and means to lock the machine after each cup is formed, substantially as described.

12. In a machine for making a paper cup, the combination of a hand operated power shaft; a roll of paper; a mandrel and connected mechanism adapted to form said paper into a tube; means associated with said mandrel for folding an integral portion of said tube over one end of said mandrel; means for compressing said folded portions into a corrugated bottom for said cup; and means automatically locking the machine after a cup is formed, substantially as described.

13. In a machine for making a paper cup, the combination of a hand operated power shaft; a roll of paper; a mandrel and connected mechanism adapted to form said paper into a tube; pivoted means associated with said mandrel for folding an integral portion of said tube over one end of said mandrel; slidable crimping means for compressing said folded portions into a bottom for said cup; and means automatically locking the machine after a cup is formed, substantially as described.

14. In a machine for making a paper cup, the combination of a hand operated power shaft; a paper roll; an expansible mandrel and connected mechanism adapted to form said paper into a tube; means associated with said mandrel for folding an integral portion of said tube over one end of said mandrel; means for compressing said folded portions into a corrugated bottom for said cup; and means automatically locking the machine after a cup is formed, substantially as described.

15. In a machine for making paper cups, the combination of a mandrel having a free end over which a finished tube may project; a sliding sleeve provided with slots surrounding said mandrel; presser rolls projecting through said slots; means for folding the projecting portion of said tube over said free end; means for compressing said folded portion into a finished bottom; and means for moving said sleeve and tube off of said mandrel, substantially as described.

16. In a machine for making paper cups, the combination of a mandrel having a free end over which a finished tube may project; a sliding sleeve provided with slots surrounding said mandrel; presser rolls projecting through said slots; a paper guide associated with said sleeve; means for folding the projecting portion of said tube over said free end; means over which said sleeve is adapted to slide for compressing said folded portion into a finished bottom; means for actuating said compressing means; and means for moving said sleeve and tube off of said mandrel, substantially as described.

17. In a machine for making paper cups, the combination of a mandrel having a free end over which a finished tube may project; means for rotating said mandrel; a sliding sleeve provided with slots surrounding said mandrel; presser rolls projecting through said slots; pivoted means for folding the projecting portion of said tube over said free end while said mandrel is rotating; means for compressing said folded portion into a finished bottom while said mandrel is rotating; and means comprising a cam and connections for moving said sleeve and tube off of said mandrel, substantially as described.

18. In a machine for making paper cartons the combination of a mandrel having a free end beyond which a finished tube is adapted to project; means for rotating said mandrel and tube; a sliding sleeve surrounding said mandrel; a sliding carriage; connections between said carriage and sleeve; means comprising rack bars and gears for reciprocating said carriage and sleeve; a cam; connections between said cam and last mentioned means for actuating said gears and rack bars; a shaft carrying said cam; means for folding the projecting end of said tube over the free end of said mandrel while the latter is rotating; means to compress said folded end portion into a finished bottom while said mandrel is rotating; a second cam on said shaft; and means coacting with said second cam for actuating said compressing means, substantially as described.

19. In a machine for making a paper cup, the combination of a paper supply; means to feed the paper from said supply; an expansible mandrel to receive and to form the fed paper into a tube; means comprising a cone adapted to move in said mandrel to expand the same before said paper is fed thereto, and to be later withdrawn to permit said mandrel to collapse; means to sever said paper into predetermined lengths; a die member associated with said mandrel; means comprising a pivoted lever to fold a portion of said tube over one end of said mandrel and die member; means comprising a slidable complementary die member to compress said folded portion into a bottom for said cup; and means comprising a spring for collapsing said mandrel after said cone has been withdrawn, substantially as described.

20. In a machine for making a paper cup, the combination of a paper supply; means to feed the paper from said supply; an expansible mandrel to receive and to form the fed paper into a tube; a cone adapted to reciprocate on the interior of said mandrel to expand and to permit the contraction of the same; means to reciprocate said cone at predetermined times; a guide associated with said mandrel for said paper; friction rollers to hold said paper associated with said mandrel; a die member associated with said mandrel; a casing surrounding said mandrel; means to fold a portion of said tube over one end of said mandrel and die member; and means to compress said folded portion into a bottom for said cup, substantially as described.

21. In a machine for making a paper cup, the combination of an expansible mandrel having a free unsupported end adapted to hold a paper tube with a portion thereof projecting beyond said end; a cone associated with said mandrel; means to reciprocate said cone at predetermined times; a die member held by said end; a complementary die member associated with said mandrel; a pivoted lever associated with said mandrel; means to actuate said lever and cause the projecting portion of said tube to be folded over said end and first named die member; and means to force said complementary die member into contact with said folded portion and against said first mentioned die member and complete the bottom of said cup, substantially as described.

22. In a machine for making a paper cup, the combination of an expansible mandrel having a free unsupported end adapted to hold a paper tube with a portion thereof projecting beyond said end; a cone located in said mandrel; means to reciprocate said cone at predetermined times; a die member held by said end; a complementary die member associated with said mandrel; a pivoted lever associated with said mandrel; means to actuate said lever and cause the projecting portion of said tube to be folded over said end and first named die member; means comprising a cam actuated lever to force said complementary die member into contact with said folded portion and against said first mentioned die member to complete the bottom of said cup, and hand operated means for actuating the machine substantially as described.

23. In a machine for making a paper cup, the combination of an expansible mandrel adapted to hold a paper tube; means to feed paper to said mandrel; means comprising a movable shear member for severing said paper into predetermined lengths; means for striking said shear member to cause it to sever said paper; means to rotate said mandrel and cause the fed paper to be formed into a tube; means associated with said mandrel for folding an integral portion of said tube over one end of said mandrel; means for compressing said folded portions into a bottom for said cup; means to collapse said mandrel after said bottom is formed, and hand operated means for actuating the machine substantially as described.

24. In a machine for making a paper cup, the combination of a paper supply; means to feed the paper from said supply; an expansible mandrel to receive and to form the fed paper into a tube; means to expand said mandrel before said paper is fed thereto; means comprising a movable shear member for severing said paper into predetermined lengths; means for striking said shear member to cause it to sever said paper; a die member associated with said mandrel; means to fold a portion of said tube over one end of said mandrel and die member; means to compress said folded portion into a bottom for said cup; means to collapse said mandrel after said bottom is completed, and hand operated means for actuating the machine substantially as described.

25. In a machine for making a paper cup, the combination of a paper supply; means to feed the paper from said supply; an expansible mandrel to receive and to form the fed paper into a tube; means to rotate said mandrel; means comprising a movable shear member for severing said paper into predetermined lengths; means for striking said shear member to cause it to sever said paper; a shaft carrying a cam; means actuated by said cam for operating said striking means at predetermined intervals; means to expand said mandrel before the paper is fed thereto; an integral portion of said tube over one end of said mandrel; slidable crimping means for compressing said folded portions into a bottom for said cup; means to collapse said mandrel after said bottom is formed, and hand operated means for actuating the machine substantially as described.

In testimony whereof, I affix my signature in presence of two witnesses.

GEORGE W. BEADLE.

Witnesses:
J. H. GEWECKE,
H. H. RODGERS.